United States Patent Office 3,382,191
Patented May 7, 1968

3,382,191
FIRE-RETARDANT PHOSPHOROUS-
CONTAINING ADDITIVES
Lester Friedman, Beachwood, Ohio, assignor to Weston Chemical Corporation, Newark, N.J., a corporation of New Jersey
No Drawing. Filed Dec. 7, 1965, Ser. No. 512,237
24 Claims. (Cl. 260—2)

ABSTRACT OF THE DISCLOSURE

Macromolecular weight phosphorous polymers having the repeating unit

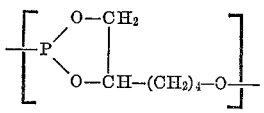

can be prepared by reacting equimolar amounts of 1,2,6-hexanetriol and a tertiary phosphite of the formula

wherein $R_4$, $R_5$, and $R_6$ are hydrocarbyl. The resulting polymer can be hydrolyzed or reacted with selected Arbuzov reagents to yield halogenated or unsaturated phosphorous polymers.

---

This invention relates to novel phosphorus containing compounds.

Chlorine and phosphorus containing compounds are very effective flame retardant additives for polyurethanes. One shortcoming of the use of low molecular weight additives of this type is that they create problems because of sweating, i.e. the additive diffuses to the surface of the polymer.

An object of the present invention is to overcome these shortcomings.

Another object is to prepare novel phosphorus compounds.

An additional object is to prepare novel phosphorus and halogen containing compounds.

Yet another object is to improve the flame resistance of polyurethanes.

A still further object is to develop stabilizers for halogen containing polymers.

Another object is to develop stabilizers for olefin polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained in several fashions.

In one aspect of the invention there is prepared a macromolecular weight polymer having the repeating unit

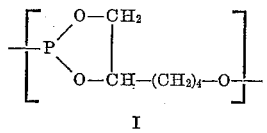

The products of the invention are high molecular weight resins.

The polymer having repeating unit I is conveniently prepared by reacting equimolar amounts of 1,2,6-hexanetriol and a tertiary phosphite of the formula

wherein $R_4$, $R_5$ and $R_6$ are hydrocarbyl, e.g. alkyl or aryl, or haloaryl and removing the monohydric alcohol or phenol formed by distillation. The reaction is preferably carried out in the presence of an alkaline catalyst or a dihydrocarbyl or dihaloaryl phosphite.

As the tertiary phosphite used to make the compounds of Formula I there can be used trimethyl phosphite, triethyl phosphite, tripropyl phosphite, triamyl phosphite, tris octyl phosphite, tris isodecyl phosphite, tri dodecyl phosphite, tris octadecyl phosphite, triphenyl phosphite, tri-o-cresyl phosphite, tri-p-cresyl phosphite, tri-m-cresyl phosphite, tri-xylenyl phosphite, phenyl diisodecyl phosphite, diphenyl p-chlorophenyl phosphite, tri-p-chlorophenyl phosphite, tri-o-chlorophenyl phosphite.

Examples of suitable catalysts are dialkyl or diaryl or dihaloaryl phosphites such as diphenyl phosphite, di-o-cresyl phosphite, di-p-cresyl phosphite, didecyl phosphite, diisodecyl phosphite, dioctadecyl phosphite, dimethyl phosphite, diethyl phosphite, di-o-chlorophenyl phosphite, di-2,4-di-chlorophenyl phosphite or alkaline catalysts such as sodium phenolate, sodium methylate, sodium cresylate, potassium phenolate, sodium isodecylate. The alkaline catalysts preferably have a pH of at least 11 in an 0.1 N aqueous solution. The catalyst is normally used in an amount of 0.05–5% by weight of the phosphite reactant.

The polymer containing repeating unit I is very reactive towards nucleophilic substances. It is rapidly hydrolyzed by water or acids, e.g. hydrochloric acid, sulfuric acid, toluene sulfonic acid, oxalic acid, hydrobromic acid, phosphoric acid, sulfurous acid, acetic acid, etc.

Hydrolysis of the polymer containing repeating unit I gives macromolecular polymers having repeating units II and III as follows

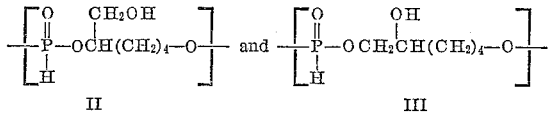

The hydrolysis is preferably carried out in an organic solvent in the presence of a small amount of water or aqueous acid. To insure complete hydrolysis there is employed 1 mole of water for each unit weight of the polymer having recurring unit I (i.e. 18 grams of water for each 162 grams of the polymer).

The polymers having repeating units II and III are useful in amounts of 0.1–10% by weight of the polymer to be stabilized as stabilizers against light and heat degradation for polyvinyl chloride, and other vinyl chloride polymers, e.g. vinyl chloride-vinylidene chloride copolymer (80:20), vinyl chloride-vinyl acetate (87:13), vinyl chloride-acrylonitrile (85:15). In the same proportions they are also stabilizers for monoolefin polymers such as polyethylene, polypropylene, ethylene-propylene copolymers (e.g. 50:50, 80:20 and 20:80), ethylene monoolefin copolymers wherein the monoolefin has 4–10 carbon atoms and is present in a minor amount, eg. ethylene butene-1 copolymer (e.g. 95:5) and ethylene-decene-1 copolymer. Furthermore they can be used in the same amounts to stabilize natural rubber, styrene-butadiene rubber, ethylene-propylene-nonconjugated diene terpolymers, e.g. ethylene-propylene-dicyclopentadiene terpolymer (e.g. 57:42:3).

The polymers having repeating units II and III also can be employed as reactive flame retardants for polyurethanes due to their free hydroxyl groups. They can be utilized prior to the reaction for forming the polyurethane from the polyisocyanate and polyol (e.g. toluene diisocyanate and polypropylene glycol molecular weight 2025) or they can be added during molding or curing of the polyurethane.

The polymers having repeating unit I are most valuable because they do ring open in the Arbuzov reaction. The halogen from the Arbuzov reagent becomes incorporated in the molecule upon ring opening and there is no by-product.

For maximum yields the polymers having repeating unit I are reacted with the Arbuzov reagent in a molar ratio of 1 unit weight of the unit I compound for each reactive halogen on the Arbuzov reagent. If the Arbuzov reagent has two or more reactive halogen atoms it cross links the polymer having repeating unit I during the Arbuzov reaction.

The Arbuzov reaction is normally carried out by heating, usually between 100 and 200° C., preferably at 125–150° C.

The Arbuzov reaction for forming one type of product according to the invention is as follows:

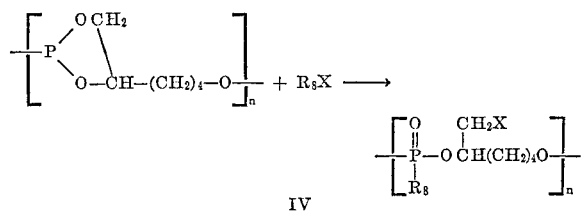

where $n$ is the number of repeating units, e.g. 5, 10, 100, 200 in the polymer having the Formula I (or the Formula IV), $R_8$ is alkyl, alkenyl, aralkyl, haloaralkyl, cycloalkenyl alkyl or halocycloalkenyl alkyl and X is chlorine, bromine or iodine.

Examples of suitable $R_8X$ compounds are methyl chloride, methyl bromide, methyl iodide, ethyl chloride, ethyl bromide, ethyl iodide, proyl chloride, isopropyl bromide, amyl chloride, butyl chloride, amyl bromide, amyl iodide, hexyl chloride, octyl chloride, octyl bromide, octyl iodide, dodecyl chloride, dodecyl bromide, dodecyl iodide, hexadecyl chloride, octadecyl chloride, octadecyl bromide, octadecyl iodide, allyl chloride, allyl bromide, allyl iodide, octadecenyl chloride (oleyl chloride), benzyl chloride, benzyl bromide, benzyl iodide, methallyl chloride, methallyl iodide, methallyl bromide, crotyl chloride, crotyl bromide 2,4,6-trichlorobenzyl chloride, 2,4,6-trichlorobenzyl bromide, 2,4,6-tribromobenzyl bromide, 2-chlorobenzyl chloride, 2-chloromethyl 1, 4, 5, 6,7,7 - hexachloroendo - cis - bicyclo (2,2,1) hept - 5 - ene (HET monochloride) having the formula

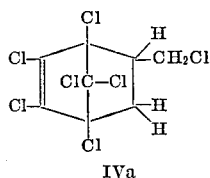

IVa and prepared by heating equimolar amounts of allyl chloride and hexachlorocyclopentadiene, 2-chloromethyl-endo-cis-bicyclo (2,2,1) hep-5-ene.

Examples of compounds within Formula IV are the reaction products of the polymer having repeating unit I with 1 mole (per repeating unit) of any of the above-mentioned $R_8X$ compounds, e.g. amyl chloride, isopropyl bromide, octyl iodide, allyl chloride, benzyl bromide and 2-chloromethyl 1,4,5,6,7,7-hexachlorobicycloheptene. The resinous compounds within Formula IV are generally viscous oils.

The products within Formula IV made from $R_8X$ compounds when $R_8$ is alkenyl (and, to a lesser extent, cyclo- alkenyl alkyl and halocycloalkenyl alkyl) can be further polymerized due to the presence of the ethylenic double bond. The further polymerization can be carried out with the aid of ultraviolet light or with free radical engendering compounds, e.g. peroxides such as benzoyl peroxide and dicumyl peroxide, azo compounds, persulfates, hydroperoxides, e.g. cumene hydroperoxide, etc.

The thus polymerized compounds are designated as compounds having Formula IVa and in general have higher softening points than the corresponding compounds of Formula IV. Specific examples of $R_8X$ compounds which can be used to make Formula IVa products are allyl chloride, vinyl bromide, crotyl chloride, methallyl bromide.

The polymers of Formula IV made from $R_8X$ compounds wherein $R_8$ is alkenyl or cycloalkenyl alkyl or halocycloalkenyl alkyl can also be reacted with chlorine or bromine across the nonaromatic double bond to increase the fire resistant properties.

Also according to the invention there can also be employed the Arbuzov reaction to react the compounds having repeating unit I with Arbuzov reagents having two (or more) reactive halogen atoms. As a result there are formed cross linked polymers which generally are solids at room temperature.

Normally there is used at least one mole of the Arbuzov reagent for each two unit weights of the polymer having repeating unit I to insure adequate cross linking. By utilizing less than one mole of the Arbuzov reagent a less highly cross linked polymer is obtained.

The equation for the reaction is represented as follows although of course the actual reaction is much more complex with cross linking

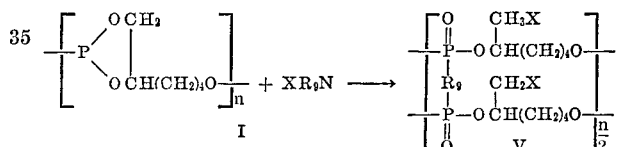

where X and $n$ are as defined above and $R_9$ is a divalent hydrocarbon or halohydrocarbon group wherein the two free valences are attached to aliphatic carbon atoms. Preferably the $XR_9X$ compound either has halogen atoms, most preferably chlorine or bromine in addition to the Arbuzov reactive halogen atoms or has aliphatic unsaturation which can be eliminated through addition of chlorine or bromine across the double or triple carbon to carbon bond subsequent to the Arbuzov reaction which forms the compounds having Formula V. The addition of chlorine or bromine to a Formula V compound can be illustrated by the following example wherein the $XR_9X$ compound is 1,4-dichlorobutene.

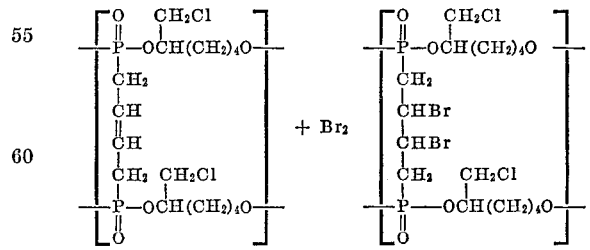

If 1,4-dichlorobutyne, for example, is employed as the starting material then there can be added two moles of bromine or chlorine per polymer unit as against one mole when the $XR_9X$ compound is 1,4-dichlorobutene.

Examples of compounds having the formula $XR_9X$ which can be reacted with the polymer having repeating unit I to form the cross linked polymers V are 1,4-dichlorobutene (both cis and trans isomers as well as a mixture of such isomers), 1,4-dichlorobutane, 1,4-dibromobutane, xylylene dichloride, tetrachloroxylylene dichloride, tetrabromoxylylene dibromide, 1,4-dichlorobutyne, 2,3-di(chloromethyl) 1,4,5,6,7,7-hexachloro-5-norbornene (HET dichloride).

Unless otherwise indicated all parts and percentages are by weight.

All of the compounds of the present invention which have halogen atoms, e.g. the polymers represented by Formulae IV, IVa and V (as well as the chlorine and bromine addition products of ethylenic and acetylenic unsaturation containing polymers of Formula V) are useful as flame retardant additives for polyurethanes and polyesters. They also are useful as flame retardant additives for hydrocarbon polymers and as polyethylene, polypropylene, ethylene-propylene-unconjugated diene terpolymers, etc.

EXAMPLE 1

A mixture of 134 grams (1 mole) of 1,2,6-hexanetriol, 310 grams (1 mole) of triphenyl phosphite and 5 grams of sodium phenate (catalyst) to keep the system basic was heated to remove the phenol formed. Phenol was removed initially at 120° C. (pot temperature) and 15 mm. Towards the end of the reaction the temperature was raised to 150–160° C. and the pressure lowered to 1–2 mm. The distillate amounted to about 280 grams. The residue was a clear, colorless highly resinous oil having the structure

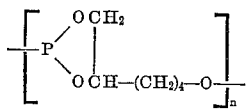

Ultraviolet analysis showed the presence of a small amount (less than 1%) of aromatic contamination. The polymer was very reactive towards nucleophilic substances and it was rapidly hydrolyzed by water and acids.

EXAMPLE 2

Approximately 16 grams of the polymer prepared in Example 1 was dissolved in 200 ml. of tetrahydrofuran and treated with 1.8 ml. of water. Evaporation of the solvent left a viscous residue that showed strong OH, PH+P=O absorption in the infrared. The structure contained repeating units II and III.

EXAMPLE 3

104 grams of the polymer of Example 1 was mixed with 85 grams (an excess) of allyl chloride and heated to 130° C. for 3 hours until reaction was complete. Excess allyl chloride, 9 grams, was removed by stripping in high vacuum. The residue was a non-burning viscous liquid poly(chlorohexylene propene phosphonate) having the formula

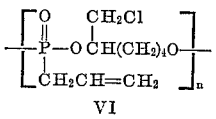
VI

The polymer VI was compatible with polyurethanes and polyesters (e.g. styrene modified dipropylene glycol adipate-maleate polymer).

Polymer VI readily added bromine across the ethylenic double bond of the allyl group to give the dibromide.

Polymer VI on exposure to ultraviolet light at 35° C. cross linked to give a hard, tough resin. In addition to the uses specified above, this resin could be molded into various article shapes and cross linked in the mold, e.g. it could be molded into a cup.

EXAMPLE 4

To 162 grams of the polymer of Example 1 there was added 400 grams (an excess) of HET monochloride and the mixture heated to 140° C. for 4 hours until reaction was complete. Excess HET monochloride was removed by stripping in high vacuum. The residue was a viscous chlorine containing phosphonate which imparted excellent flame resistance when added to polymer formulations. It had the formula

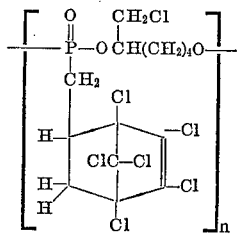

EXAMPLE 5

162 grams of the polymer of Example 1 was mixed with 141 grams (an excess) of allyl bromide and heated to 135° C. for 4 hours until the reaction was complete. Excess allyl bromide was removed by stripping in high vacuum. The residue was the non-burning viscous liquid poly (bromohexylene propene phosphonate) analogue of the chloro polyphosphonate of Example 3.

EXAMPLE 6

162 grams of the polymer of Example 1 was mixed with 127 grams of amyl chloride and heated to 130° C. for 4 hours until the reaction was complete. The excess amyl chloride was removed by stripping in high vacuum. The residue was a non burning viscous liquid, poly (chlorohexylene pentane phosphonate) within Formula IV.

EXAMPLE 7

To 162 grams of the polymer of Example 1 there was added 200 grams of benzyl bromide and the mixture heated to 140° C. for 4 hours to complete the reaction. Excess benzyl bromide was removed by stripping in high vacuum. The residue was a viscous product, poly (bromohexylene phenylmethane phosphonate) within Formula IV.

EXAMPLE 8

The procedure of Example 7 was repeated replacing the benzyl bromide by 275 grams of 2,4,6-trichlorobenzyl chloride to produce as the viscous residue, poly (chlorohexylene 2,4,6 - trichlorophenylmethane phosphonate) within Formula IV.

EXAMPLE 9

To 162 grams of the polymer of Example 1 there was added 80 grams of 1,4-dichlorobutane and the mixture heated to 130° C. for 3.5 hours. The excess dichloro- was removed by stripping in high vacuum. The residue was a non-burning cross linked resinous polymer.

EXAMPLE 10

To 162 grams of the polymer of Example 1 there was added 80 grams of 1,4-dichlorobutene-2 and the mixture heated to 130° C. for 3–5 hours. The excess dichlorobutene was removed by stripping in high vacuum. The residue was a non-burning cross linked resinous polymer which readily added one mole of bromine for each two phosphorus atoms. (The addition was across the ethylenic double bond of the —CH₂CH=CHCH₂— grouping.)

EXAMPLE 11

To 162 grams of the polymer of Example 1 there were added 175 grams of tetrachloroxylylene dichloride and the mixture heated to 135° C. for 3 hours. The excess tetrachloroxylylene dichloride was removed by stripping in high vacuum. The residue was a non-burning cross linked resinous polymer.

EXAMPLE 12

To 162 grams of the polymer of Example 1 there were added 239 grams of HET dichloride and the mixture heated to 140° C. for 4 hours. The excess HET dichloride was removed by stripping in high vacuum. The residue was a non-burning cross linked resinous polymer.

I claim:
1. A polymer having the repeating unit

$$-\left[\begin{array}{c}P\begin{array}{c}O-CH_2\\O-CH-(CH_2)_4O\end{array}\end{array}\right]-$$

2. A process of preparing a linear polymer comprising hydrolyzing the polymer of claim 1.
3. A polymer having a repeating unit selected from the group consisting of (a)
$$-\left[\begin{array}{c}O\quad CH_2OH\\ \parallel\quad\ \ \ |\\ -P-OCH(CH_2)_2O-\\ |\\ H\end{array}\right]-$$

and (b)
$$-\left[\begin{array}{c}O\quad\ \ \ OH\\ \parallel\quad\ \ \ |\\ -P-OCH_2CH(CH_2)_4O-\\ |\\ H\end{array}\right]-$$

4. A process of preparing a flame retardant phosphonate polymer comprising reacting the polymer of claim 1 with a compound having the formula $R_8X$ wherein $R_8$ is selected from the group consisting of alkenyl, alkyl, aralkyl, haloaralkyl, cycloalkenyl alkyl and halocycloalkenyl alkyl and X is halogen of atomic weight 35 to 127.
5. A process according to claim 4 where $R_8$ is alkyl.
6. A process according to claim 4 wherein $R_8$ is alkenyl.
7. A process according to claim 4 wherein $R_8$ is

[structure: chlorinated cyclohexenyl-methyl group]

8. A polymer having the repeating unit $$-\left[\begin{array}{c}O\quad CH_2X\\ \parallel\quad\ \ \ |\\ -P-OCH(CH_2)_4O-\\ |\\ R_8\end{array}\right]-$$

where $R_8$ is selected from the group consisting of alkyl, alkenyl, aralkyl, haloaralkyl, cycloalkenyl alkyl and halocycloalkenyl alkyl and X is a halogen of atomic weight 35 to 127.
9. A polymer according to claim 8 wherein $R_8$ is alkyl.
10. A polymer according to claim 8 wherein $R_8$ is alkenyl.
11. A polymer prepared by adding a halogen of atomic weight 35 to 80 across the ethylenic double bond of the alkenyl group in the polymer of claim 10.
12. A polymer prepared by further polymerizing the polymer of claim 10 through the ethylenic double bond.
13. A polymer according to claim 8 wherein $R_8$ is selected from the group consisting of aralkyl and haloaralkyl wherein the halogen atoms have an atomic weight of 35 to 80.

14. A polymer according to claim 8 wherein $R_8$ is cycloalkenylmethyl.
15. A polymer according to claim 8 wherein $R_8$ is

[structure: chlorinated cyclohexenyl-methyl group]

16. A phosphonate polymer prepared by reacting the polymer of claim 1 with a compound having the formula $XR_9X$ where $R_9$ is a member of the group consisting of divalent hydrocarbon groups and divalent halohydrocarbon groups in which the two free valences are attached to aliphatic carbon atoms and X is a halogen of atomic weight 35 to 127.
17. A phosphonate polymer according to claim 16 wherein $XR_9X$ is a dihaloalkane in which the halogen atoms have an atomic weight of 35 to 80.
18. A phosphonate polymer according to claim 16 wherein $XR_9X$ is a dihaloalkene in which the halogen atoms have an atomic weight of 35 to 80.
19. A phosphonate polymer prepared by reacting a halogen having an atomic weight of 35 to 80 with the polymer of claim 18.
20. A phosphonate polymer according to claim 16 wherein $XR_9X$ is a dihaloalkyne in which the halogen atoms have an atomic weight of 35 to 80.
21. A phosphonate polymer prepared by reacting a halogen having an atomic weight of 35 to 80 with the polymer of claim 20.
22. A phosphonate polymer according to claim 16 wherein each X is a halogen of atomic weight 35 to 80 and $R_9$ is xylylene.
23. A phosphonate polymer according to claim 16 wherein each X is a halogen of atomic weight 35 to 80 and $R_9$ is polyhaloxylylene in which the halogen atoms have an atomic weight of 35 to 80.
24. A phosphonate polymer according to claim 16 wherein $XR_9X$ is

[structure: chlorinated cyclohexenyl with two $CH_2Cl$ groups]

References Cited

UNITED STATES PATENTS

| | | | |
|---|---|---|---|
| 3,039,993 | 6/1962 | Friedman | 260—45.8 |
| 3,053,878 | 9/1962 | Friedman | 260—461 |
| 3,142,651 | 7/1964 | Friedman | 260—2.5 |
| 3,257,355 | 6/1966 | Bean | 260—2 |
| 3,271,329 | 9/1966 | Coover et al. | 260—2 |

MURRAY TILLMAN, *Primary Examiner.*

J. GOOLKASIAN, *Assistant Examiner.*